(12) United States Patent
Makuta (10) Patent No.: US 10,640,666 B2
(45) Date of Patent: May 5, 2020

(54) INK JET RECORDING METHOD AND INK JET RECORDING DEVICE

(71) Applicant: FUJIFILM CORPORATION, Minato-ku, Tokyo (JP)

(72) Inventor: Toshiyuki Makuta, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 15/913,926

(22) Filed: Mar. 7, 2018

(65) Prior Publication Data

US 2018/0194957 A1 Jul. 12, 2018

Related U.S. Application Data

(63) Continuation of application No. PCT/JP2016/069550, filed on Jun. 30, 2016.

(30) Foreign Application Priority Data

Sep. 30, 2015 (JP) .................. 2015-194070

(51) Int. Cl.
*B41J 2/01* (2006.01)
*C09D 11/36* (2014.01)
(Continued)

(52) U.S. Cl.
CPC ............. *C09D 11/36* (2013.01); *B41J 11/002* (2013.01); *B41M 5/0023* (2013.01); *B41M 7/009* (2013.01); *B41M 7/0081* (2013.01); *C09D 11/033* (2013.01); *C09D 11/037* (2013.01); *C09D 11/101* (2013.01);
(Continued)

(58) Field of Classification Search
USPC ......................................................... 347/102
See application file for complete search history.

(56) References Cited

U.S. PATENT DOCUMENTS

| 5,729,274 A | 3/1998 | Sato |
| 2004/0126510 A1 | 7/2004 | Wood et al. |
(Continued)

FOREIGN PATENT DOCUMENTS

| CN | 1726263 A | 1/2006 |
| CN | 1727414 A | 2/2006 |
(Continued)

OTHER PUBLICATIONS

International Search Report issued in International Application No. PCT/JP2016/069550 dated Aug. 9, 2016.
(Continued)

*Primary Examiner* — Lam S Nguyen
(74) *Attorney, Agent, or Firm* — SOLARIS Intellectual Property Group, PLLC (57) ABSTRACT

An ink jet recording method includes, in order, a jetting step of jetting an ink including an organic solvent, an oligomer having an ethylenically unsaturated group, and a pigment, and not including a polymerization initiator or including a polymerization initiator at a content of more than 0% by mass and 0.1% by mass or less onto a base material using an ink jet head, a drying step of drying the ink by removing at least a part of the organic solvent in the jetted ink, and a curing step of curing the dried ink with an electron beam.

20 Claims, 1 Drawing Sheet

(51) Int. Cl.
C09D 11/322 (2014.01)
B41M 7/00 (2006.01)
C09D 11/101 (2014.01)
B41M 5/00 (2006.01)
C09D 11/326 (2014.01)
B41J 11/00 (2006.01)
C09D 11/033 (2014.01)
C09D 11/037 (2014.01)
C09D 11/38 (2014.01)

(52) U.S. Cl.
CPC .......... *C09D 11/322* (2013.01); *C09D 11/326* (2013.01); *C09D 11/38* (2013.01)

(56) References Cited

U.S. PATENT DOCUMENTS

| | | | |
|---|---|---|---|
| 2006/0025497 | A1 | 2/2006 | Ushirogouchi et al. |
| 2008/0018695 | A1* | 1/2008 | Kadomatsu ............ B41J 2/2114 347/21 |
| 2011/0229641 | A1 | 9/2011 | Yasuda |
| 2012/0075394 | A1 | 3/2012 | Ohnishi |
| 2014/0104357 | A1 | 4/2014 | Shimohara |
| 2014/0347429 | A1 | 11/2014 | Gould |
| 2015/0210876 | A1* | 7/2015 | Amao .................. C09D 11/101 347/102 |
| 2015/0225585 | A1 | 8/2015 | De Rossi et al. |

FOREIGN PATENT DOCUMENTS

| | | |
|---|---|---|
| CN | 102190924 A | 9/2011 |
| CN | 102459480 A | 5/2012 |
| CN | 103619973 A | 3/2014 |
| JP | H06-155790 A | 6/1994 |
| JP | H08-218016 A | 8/1996 |
| JP | H08-218018 A | 8/1996 |
| JP | 2001-311021 A | 11/2001 |
| JP | 2004-42466 A | 2/2004 |
| JP | 2004-98309 A | 4/2004 |
| JP | 2013-502480 A | 1/2013 |
| JP | 2015-48387 A | 3/2015 |
| JP | 2016-180072 A | 10/2016 |
| WO | 2013/093414 A2 | 6/2013 |
| WO | 2014/029381 A2 | 2/2014 |
| WO | 2016/158209 A1 | 10/2016 |

OTHER PUBLICATIONS

Written Opinion of the ISA issued in International Application No. PCT/JP2016/069550 dated Aug. 9, 2016.
Extended European Search Report dated Jun. 6, 2018, issued in corresponding EP Patent Application No. 16850789.5.
English language translation of the following: Office action dated May 22, 2018 from the JPO in a Japanese patent application No. 2017-542943 corresponding to the instant patent application.
English language translation of the following: Office action dated Feb. 2, 2019 from the SIPO in a Chinese patent application No. 201680053187.9 corresponding to the instant patent application.
Search Report of the Chinese office action dated Jan. 23, 2019, from the SIPO in a Chinese patent application corresponding to the instant patent application.

* cited by examiner

INK JET RECORDING METHOD AND INK JET RECORDING DEVICE

CROSS-REFERENCE TO RELATED APPLICATIONS

This application is a Continuation of International Application No. PCT/JP2016/069550 filed on Jun. 30, 2016, which claims priority to Japanese Patent Application No. 2015-194070 filed on Sep. 30, 2015. The entire contents of these applications are incorporated herein by reference.

BACKGROUND OF THE INVENTION

1. Field of the Invention

The present invention relates to an ink jet recording method and an ink jet recording device.

2. Description of the Related Art

As image recording methods for forming an image on a base material such as paper based on image data signals, there are an electrophotographic method, sublimation-type and fusion-type thermal transfer methods, an ink jet method, and the like.

With regard to the ink jet method, since the printing device is inexpensive, it is not necessary to use a plate during printing, and an image is formed directly on a base material by jetting an ink only onto a required image area. Thus, the ink can be efficiently used and particularly in the case of a small lot production, the running costs are low. In addition, the ink jet method causes little noise and is excellent as an image recording method, and thus, it has been attracting attention recently.

Among these, a method using an ink jet ink which is curable by irradiation with radiation rays such as ultraviolet rays and the like (an ink composition for radiation curable type ink jet recording), is excellent from the viewpoint of being able to perform printing on various base materials because, as compared with solvent-based inks, the drying properties are excellent and an image is resistant to bleeding since most of the components in the ink are cured by irradiation with radiation rays such as ultraviolet rays.

Examples of ink in the related art include those described in JP1996-218018A (JP-H08-218018A), JP2001-311021A, or JP2013-502480A.

SUMMARY OF THE INVENTION

An object to be achieved by one aspect of the present invention is to provide an ink jet recording method and an ink jet recording device capable of obtaining a printed material in which there is little leaching out of an ink composition and excellent alcohol resistance and high temperature resistance are exhibited.

The above object has been achieved by the following means of <1> or <8>. <2> to <7> and <9> to <14>, which are preferable aspects, will be listed together with <1> and <8> below.

<1> An ink jet recording method comprising, in order: a jetting step of jetting an ink including an organic solvent, an oligomer having an ethylenically unsaturated group, and a pigment, and not including a polymerization initiator or including a polymerization initiator at a content of more than 0% by mass and 0.1% by mass or less onto a base material using an ink jet head; a drying step of drying the ink by removing at least a part of the organic solvent in the jetted ink; and a curing step of curing the dried ink with an electron beam.

<2> The ink jet recording method according to <1>, in which an acceleration voltage of the electron beam is 150 kV or less and an absorbed dose of the electron beam of the dried ink in the curing step is 30 kGy or less.

<3> The ink jet recording method according to <1> or <2>, in which a content of the oligomer having an ethylenically unsaturated group is 99% by mass or more with respect to a total mass of an ethylenically unsaturated compound in the ink in the jetting step.

<4> The ink jet recording method according to any one of <1> to <3>, in which the ink in the jetting step does not include an ethylenically unsaturated compound having a molecular weight of less than 1,000 or a content of an ethylenically unsaturated compound having a molecular weight of less than 1,000 is more than 0% by mass and 0.1% by mass or less with respect to a total mass of the ink.

<5> The ink jet recording method according to any one of <1> to <4>, in which the organic solvent includes a carbonate compound.

<6> The ink jet recording method according to <5>, in which the organic solvent includes a glycol ether compound and a carbonate compound.

<7> The ink jet recording method according to any one of <1> to <6>, in which the drying step is a step of performing heat drying.

<8> An ink jet recording device comprising: a base material transporting device in which an ink jet head, drying means, and an electron beam source are sequentially arranged; and an ink including an organic solvent, an oligomer having an ethylenically unsaturated group, and a pigment, and not including a polymerization initiator or including a polymerization initiator at a content of more than 0% by mass and 0.1% by mass or less.

<9> The ink jet recording device according to <8>, in which an acceleration voltage of the electron beam in the electron beam source is 150 kV or lower, and the dried ink is curable at an absorbed dose of the electron beam of 30 kGy or less.

<10> The ink jet recording device according to <8> or <9>, in which a content of the oligomer having an ethylenically unsaturated group is 99% by mass or more with respect to a total mass of an ethylenically unsaturated compound in the ink.

<11> The ink jet recording device according to any one of <8> to <10>, in which the ink does not include an ethylenically unsaturated compound having a molecular weight of less than 1,000 or a content of an ethylenically unsaturated compound having a molecular weight of less than 1,000 is more than 0% by mass and 0.1% by mass or less with respect to a total mass of the ink.

<12> The ink jet recording device according to any one of <8> to <11>, in which the organic solvent includes a carbonate compound.

<13> The ink jet recording device according to <12>, in which the organic solvent includes a glycol ether compound and a carbonate compound.

<14> The ink jet recording device according to any one of <8> to <13>, in which the drying means has a heating dryer.

According to the aspects of the present invention, it is possible to provide an ink jet recording method and an ink jet recording device capable of obtaining a printed material in which there is little leaching out of an ink composition and excellent alcohol resistance and high temperature resistance are exhibited.

DESCRIPTION OF THE PREFERRED EMBODIMENTS

Hereinafter, the contents of the present disclosure will be described in detail. The following description of the constitutional requirements below is made based on representative embodiments of the present disclosure, but it should not be construed that the present disclosure is limited to those embodiments.

In the present disclosure, the description of "lower limit to upper limit" indicating numerical value ranges represents "more than or equal to the lower limit and less than or equal to the upper limit", and the description of "upper limit to lower limit" represents "less than or equal to the upper limit and more than or equal to the lower limit". That is, the descriptions represent numerical value ranges respectively including an upper limit and a lower limit.

Further, in regard to a description of a group (atomic group) in the present specification, a description that does not indicate substitution or unsubstitution is meant to include a group that does not have a substituent, as well as a group having a substituent. For example, the term "alkyl group" is meant to include an alkyl group that does not have a substituent (unsubstituted alkyl group) as well as an alkyl group that has a substituent (substituted alkyl group).

The term "(meth)acrylate" or the like is synonymous with "either or both of acrylate and methacrylate" or the like.

In addition, in the present disclosure, the terms "% by mass" and "% by weight" are synonymous, and the terms "parts by mass" and "parts by weight" are synonymous.

In addition, in the present disclosure, a combination of two or more preferred embodiments is a more preferred embodiment.

(Ink Jet Recording Method)

The ink jet recording method of the present disclosure includes, in order, a jetting step of jetting an ink including an organic solvent, an oligomer having an ethylenically unsaturated group, and a pigment, and not including a polymerization initiator or including a polymerization initiator at a content of more than 0% by mass and 0.1% by mass or less onto a base material using an ink jet head, a drying step of drying the ink by removing at least a part of the organic solvent in the jetted ink, and a curing step of curing the dried ink with an electron beam.

A printed material obtained by a radiation curable type ink jet recording method of the related art has a problem that unreacted monomers as an ink composition, a polymerization initiator, a polymerization initiator residue, and the like are moved from a cured film, and particularly, in a case of use in printing for a package for wrapping food or the like, an amount to be transferred to the contents in the package, that is, a so-called migration (leaching out) amount is large. In addition, there is a problem that the odor of a cured film is strong and is transferred to the contents or nearby food.

In contrast, as disclosed in JP2008-68516A, a method of performing curing at a low oxygen concentration using a light emitting diode (LED) light source as a curing light source has been known. In this case, the present disclosures have found that although unreacted monomers remaining after curing can be almost removed, a polymerization initiator and a decomposition product of the polymerization initiator remain in an ink film and are transferred to the contents in the package.

On the other hand, a non-curable type ink has a low possibility of causing such a problem but it is difficult to secure fixing properties to a base material. An aqueous ink in which latex is incorporated to secure fixing properties has been known. However, the present inventors have found that it is necessary to decrease the glass transition temperature (Tg) of such latex, and in a case where printing is performed on a base material for retort food, the ink is softened by boiling at a high temperature for retort sterilization or the like in a retort food production process, image quality is deteriorated, and the image is removed by wiping with alcohol used for the purpose of sterilization.

As a result of conducting a detailed examination by the present inventors, it has been found that by using an ink including an organic solvent, an oligomer having an ethylenically unsaturated group, and a pigment and not including a polymerization initiator or including a polymerization initiator at a content of more than 0% by mass and 0.1% by mass or less and drying and curing the ink with an electron beam, it is possible to obtain a printed material exhibiting little odor and migration of the ink composition and having excellent alcohol resistance and high temperature resistance.

<Jetting Step>

The ink jet recording method of the present disclosure includes a jetting step of jetting an ink including an organic solvent, an oligomer having an ethylenically unsaturated group, and a pigment and not including a polymerization initiator or including a polymerization initiator at a content of more than 0% by mass and 0.1% by mass or less onto a base material using an ink jet head.

The details of the ink used in the present disclosure will be described later.

The base material (a recording medium, a support and the like) used in the ink jet recording method of the present disclosure is not particularly limited and a known base material can be used.

Among these, a transparent base material is preferable.

It should be noted that the term "transparent" used in the present disclosure means having a visible light transmittance of 80% or higher and preferably a visible light transmittance of 90% or higher. In addition, the transparent base material may be a colored base material as long as the material is transparent but is preferably a colorless transparent base material.

Specific examples of the base material include glass, quartz, and a plastic film (for example, cellulose diacetate, cellulose triacetate, cellulose propionate, cellulose butyrate, cellulose acetate butyrate, cellulose nitrate, an acrylic resin, a chlorinated polyolefin resin, a polyether sulfone resin, polyethylene terephthalate (PET), polyethylene naphthalate, nylon, polyethylene, polystyrene, polypropylene, a polycycloolefin resin, a polyimide resin, a polycarbonate resin, and polyvinyl acetal).

In addition, as the transparent base material, a mixture of two or more of the above resins may be used or one formed by laminating two or more layers of these resins may be used.

Among these, the base material is preferably a base material having an image formation surface constituted of at least one resin selected from the group consisting of a polyolefin resin, a polyester resin, and a polyamide resin, more preferably a base material having an image formation surface constituted of at least one resin selected from the group consisting of polyethylene terephthalate, polyethylene, polypropylene, and nylon, and even more preferably a base material constituted of at least one resin selected from the group consisting of polyethylene terephthalate, polyethylene, polypropylene, and nylon.

As the polyethylene, low density polyethylene (LDPE), medium density polyethylene (MDPE), or high density polyethylene (HDPE) is preferably used and as polypropylene, cast polypropylene (CPP), biaxially oriented polypropylene (OPP), polyvinylidene chloride coated OPP (KOP), or PVA coated OPP (AOP) is preferably used. As the polyethylene terephthalate, biaxially oriented polyester is preferably used and as the nylon, oriented nylon (ON), oriented nylon (KON), or cast nylon (CN) is preferably used.

Other than the above, base materials obtained by combining an ethylene-vinyl acetate copolymer film (EVA), vinylon (PVA), polyvinyl alcohol (EVOH), polyvinyl chloride (PVC), polyvinylidene chloride (PVDC, Saran), cellophane (PT, MST, K cello), Zekuron (ZX, (polyacrylonitrile, PAN)), and polystyrene (PS, styrol), and at least one resin selected from the group consisting of a polyolefin resin, a polyester resin, and a polyamide resin are also preferable.

The optimal material is selected for the base material depending on the use thereof. In addition, it is possible to manufacture a film where the characteristics of each of the materials are combined by setting a film as a base material which has a multilayer structure.

In addition, for the purpose of improving the strength of the base material, blocking oxygen, and the like, it is possible to incorporate aluminum foil (AL), an aluminum vapor deposition film or transparent vapor deposition film (VM film) or the like in the multilayer structure.

Further, in recent years, a coextruded film where lamination is performed at the same time as resins are extruded together from two or more parallel slits and formed into a film is also preferably used. Since lamination is possible up to a maximum of 5 to 7 layers even for thin layers of several μm which cannot take the shape of a film, films with a variety of performances and applications have been made.

Although the thickness of the base material is not particularly limited, the thickness is preferably 1 to 500 μm, more preferably 2 to 200 μm, even more preferably 5 to 100 μm, and particularly preferably 10 to 90 μm.

In the jetting step, the ink is jetted onto the base material using an ink jet head.

As means for jetting the ink by an ink jet method, an ink jet head is preferably used.

As the ink jet head, for example, ink jet heads adopting an electric charge control method of jetting an ink using an electrostatic attraction force, a drop-on-demand method (pressure pulse method) using vibration pressure of a piezoelectric element, and a sound ink jet method of changing an electrical signal to a sound beam to irradiate an ink with the sound beam and jetting the ink using radiation pressure are suitable.

An ink jet recording device that can be used in the ink jet recording method of the present disclosure is not particularly limited and a known ink jet recording device having electron beam irradiation means and capable of achieving the desired resolution can be used.

As the ink jet recording device that can be used in the ink jet recording method of the present disclosure, the ink jet recording device of the present disclosure which will be described later can be suitably used.

In addition, in the ink jet recording method of the present disclosure, single pass ink jetting is preferably performed.

Examples of the ink jet recording device that can be used in the present disclosure include a device including an ink supply system, a temperature sensor, and an electron beam source.

The ink supply system includes, for example, a main tank containing the ink, a supply pipe, an ink supply tank immediately before an ink jet head, a filter, a piezo type ink jet head. The piezo system ink jet head can be driven so as to jet a multisize dot of preferably 1 to 100 pl, and more preferably 8 to 30 pl, at a resolution of preferably 320×320 to 4,000×4,000 dpi, more preferably 400×400 to 1,600×1,600 dpi, and even more preferably 600×600 to 1,200×1,200 dpi. Here, dpi referred to in the present disclosure means the number of dots per 2.54 cm.

In a case where only one ink is used as the ink used in the ink jet recording method of the present disclosure, the total ink jetting amount per unit area is preferably 0.001 to 10 $g/m^2$, more preferably 0.01 to 9 $g/m^2$, and particularly preferably 0.5 to 8 $g/m^2$.

In a case where two or more inks are used as the ink used in the ink jet recording method of the present disclosure, the total ink jetting amount per unit area is preferably 0.001 to 10 $g/m^2$, more preferably 0.01 to 9 $g/m^2$, and particularly preferably 0.5 to 8 $g/m^2$.

Since it is preferable for the ink to be jetted at a constant temperature, the ink jet recording device is preferably provided with means for stabilizing the temperature of the ink. A portion to be kept at a constant temperature is a pipe system from the ink tank (intermediate tank in a case where there is an intermediate tank) to the ejection surface of the nozzle and all members. That is, a portion from the ink supplying tank to the portion of the ink jet head can be insulated and heated.

The method of controlling temperature is not particularly limited. However, for example, it is preferable to provide plural temperature sensors to the respective portions in the pipe so as to control heating according to the flow rate of the ink and environmental temperature. The temperature sensors can be provided near the nozzle of the ink supplying tank and the ink jet head. In addition, the head unit to be heated is preferably thermally blocked or insulated such that the body of the device is not influenced by the temperature of the outside air. In order to shorten a rise time of a printer required for heating, or to reduce the loss of heat energy, it is preferable to insulate the heating unit from other portions and reduce thermal capacity of the whole heating unit.

It is preferable that the temperature of the ink at jetting is kept constant as much as possible. Thus, in the present disclosure, a control width of the temperature of the ink is set appropriately such that the width is preferably ±5° C. of a set temperature, more preferably ±2° C. of a set temperature, and even more preferably ±1° C. of a set temperature.

In addition, in the ink jet recording method of the present disclosure, the inks may be used singly or in combination of two or more thereof.

At least one ink of inks used in the ink jet recording method of the present disclosure may be an ink including an organic solvent, an actinic ray curable oligomer, and a pigment and not including a polymerization initiator or including a polymerization initiator at a content of more than 0% by mass and 0.1% by mass or less. However, all inks used in the ink jet recording method of the present disclosure are preferably inks including an organic solvent, an actinic ray curable oligomer, and a pigment and not including a polymerization initiator or including a polymerization initiator at a content of more than 0% by mass and 0.1% by mass or less.

For example, in a case of forming a color image, at least respective color inks of yellow, cyan, magenta, and black are preferably used and respective color inks of white, yellow, cyan, magenta, and black are more preferably used.

In addition, light color inks of light magenta, light cyan, and the like, specific color inks of orange, green, violet, and the like, metallic inks, and the like may be used.

In addition, in the ink jet recording method of the present disclosure, a clear ink may be used as an ink other than the above-specified inks.

In the ink jet recording method of the present disclosure, in a case of using two or more inks, the order of each ink to be jetted is not particularly limited. However, a black ink is preferably first jetted onto the base material and in a case of using yellow, cyan, magenta, and black inks, the inks are preferably jetted onto the base material in the order of black, cyan, magenta, and yellow. In addition, in a case of using a white ink in addition to these color inks, the inks are preferably jetted onto the base material in the order of black, cyan, magenta, yellow, and white. Further, although the present disclosure is not limited thereto, it is possible to preferably use an ink set including at least a total of 7 colors of inks, which are yellow, light cyan, light magenta, cyan, magenta, black, and white. In this case, it is preferable that the inks are jetted onto the base material in the order of black, cyan, magenta, yellow, light magenta, light cyan, and white.

<Drying Step>

The ink jet recording method of the present disclosure includes a drying step of drying the ink by removing at least a part of the organic solvent in the ink jetted in the jetting step.

A drying method used in the drying step is not particularly limited as long as at least a part of the organic solvent in the ink can be removed. At least one method selected from the group consisting of heat drying, reduced pressure drying, and drying by air (air drying) is preferably used.

Among these, in the drying step, it is preferable to perform at least heat drying.

The heating temperature at the time of heat drying depends on the boiling point of the organic solvent to be used or the like, but the surface temperature of the base material is preferably 30° C. to 90° C., more preferably 40° C. to 80° C., and even more preferably 50° C. to 80° C.

In addition, the heating time at the time of heat drying depends on the ink jetting amount, the boiling point of the organic solvent to be used, and the like, but the heating time is preferably 0.05 to 10 seconds, more preferably 0.1 to 5 seconds, and even more preferably 0.1 to 3 seconds.

Heating means used in the heat drying is not particularly limited and a known heating dryer such as a heater can be used.

The atmospheric pressure at the time of reduced pressure drying is not particularly limited as long as at least a part of the organic solvent in the ink can be removed.

Pressure reducing means used in the reduced pressure drying is not particularly limited and known pressure reducing means such as a vacuum pump can be used.

Air blowing means used in the air drying is not particularly limited and known air blowing means such as a fan or an air blower can be used.

In addition, in the air drying, dry air and dry gas such as dry nitrogen may be sent.

In the ink jet recording method of the present disclosure, in a case of using 2 or more inks, the drying step may be performed at each jetting of one ink or may be performed after jetting of all inks to be used is completed. However, it is preferable that the drying step is performed after jetting of all inks to be used is completed.

<Curing Step>

The ink jet recording method of the present disclosure includes a curing step of curing the ink dried in the drying step with an electron beam.

In the ink jet recording method of the present disclosure, in a case of using 2 or more inks, the curing step may be performed at each jetting and drying of one ink or may be performed after jetting and drying of all inks to be used is completed. However, it is preferable that the curing step is performed after jetting and drying of all inks to be used is completed.

The electron beam reaches the lowermost layer (ink in contact with the base material) even in a case of applying and layering the 2 or more inks.

The electron beam is an electron particle beam.

Electron beam exposure means used in the curing step is not particularly limited and a known electron beam irradiation device or electron beam accelerator can be used.

As the electron beam irradiation device or electron beam accelerator, a scanning type, double scanning type, or curtain beam type device can be employed, and preferably, a curtain beam type device which is relatively cheap and can obtain a large output can be employed.

The acceleration voltage of the electron beam in the curing step is preferably 150 kV or less, more preferably 30 to 150 kV, even more preferably 50 to 130 kV, particularly preferably 70 to 110 kV, and most preferably 80 to 110 kV. In a case where the acceleration voltage is within the above range, generation of a low molecular weight compound derived from the base material can be suppressed and odor and heptane extract are further reduced in a printed material to be obtained.

The ink is irradiated with the electron beam in the curing step such that the absorbed dose of the electron beam of the dried ink is preferably 30 kGy or less, more preferably 5 to 30 kGy, and particularly preferably 10 to 30 kGy. In a case where the absorbed dose of the electron beam is within the above range, generation of a low molecular weight compound derived from the base material can be suppressed. Thus, odor and heptane extract are further reduced in a printed material to be obtained, energy efficiency is excellent, and excellent economic efficiency is obtained.

In the curing step, the electron beam irradiation may be performed only one time or may be performed two or more times, but is preferably performed only one time. In addition, in a case of performing the electron beam irradiation two or more times, it is preferable that irradiation is performed such that the total absorbed dose of the electron beam to be applied is 30 kGy or less.

The irradiation time of the electron beam is not particularly limited as long as the absorbed dose is within the above range.

The atmosphere of the irradiation of the electron beam is not particularly limited but an oxygen concentration of 2% by volume or less is preferable, an oxygen concentration of 1% by volume or less is more preferable, and an oxygen concentration of 300 ppm or less is even more preferable. In a case where the oxygen concentration is within the above range, curability, particularly, surface curability is excellent. In addition, it is preferable that the oxygen concentration is adjusted by nitrogen purge.

Regarding the electron beam irradiation device, the operation conditions thereof, and the like, known devices, conditions, and the like described in "UV•EB Kokagijutsu (UV•EB Curing Technology)" (1982, Published by Sogo Gijutsu Center), "Teienerugi Denshisenshosha no Oyogijutsu (Applied Technology of Low-energy Electron Beam Irradiation)" (2000, Published by CMC), and the like can be used.

In addition, in the ink jet recording method of the present disclosure, the transport speed of the base material, that is, the printing speed is preferably 5 to 300 m/min, more preferably 20 to 200 m/min, even more preferably 25 to 100 m/min, and particularly preferably 25 to 75 m/min. According to the ink jet recording method of the present disclosure, even at the time of high speed printing as described above, it is possible to obtain a printed material in which there are little odor and heptane extract and alcohol resistance and high temperature resistance are excellent.

<Laminate Processing Step>

The ink jet recording method of the present disclosure may further include a laminate processing step of forming at least an adhesive layer and a laminate film on the surface of the base material having the cured ink thereon after the curing step.

In addition, the laminate processing step is more preferably a laminate processing step of forming at least an adhesive layer and a laminate film over the entire surface of the base material having the cured ink thereon.

By the laminate processing, it is possible to further suppress the elution of the ink components from the printed material, blocking, and the volatilization and elution of the residual monomer, and it is possible to preferably use the printed material as a food package in particular.

The adhesive layer is not particularly limited and can be formed by applying a known adhesive by a known method.

As the laminate film, a resin film is suitably used and a polyethylene terephthalate film, a polypropylene film, a nylon film, a polyvinyl chloride film, a polyethylene film, and a triacetylcellulose film can be exemplified. In addition, these films may be biaxially stretched.

In the laminate processing step, the laminate film may be laminated after the adhesive layer is formed on an image, or after the adhesive layer is first applied to the laminate film, the laminate may be laminated on an image.

The method for laminate processing is not particularly limited and a known method can be used. However, dry lamination can be exemplified.

In a case of using a resin film for the base material, although depending on the laminate processing method to be selected, it is preferable to use a resin film exhibiting high adhesiveness with the resin film used on the surface of the base material to be subjected to laminate processing.

<Surface Treatment Step>

It is preferable that the ink jet recording method of the present disclosure further includes a surface treatment step of treating at least one surface of the base material before the jetting step.

The surface treatment in the surface treatment step is not particularly limited and a known surface treatment can be performed as necessary. A hydrophilization treatment is preferable and a corona treatment is more preferably used.

The surface of the base material is subjected to a hydrophilization treatment, particularly a corona treatment, so as to improve adhesiveness between the base material and the ink and image quality.

In the surface treatment of the base material in the ink jet recording method of the present disclosure, a base material which is subjected to a surface treatment in advance may be used. However, it is preferable to use an ink jet recording device provided with surface treatment means.

The ink jet recording method of the present disclosure may include steps other than the above steps.

Other steps are not particularly limited and may include known steps.

<Ink>

The ink jet recording method of the present disclosure uses at least an ink including an organic solvent, an oligomer having an ethylenically unsaturated group, and a pigment, and not including a polymerization initiator or including a polymerization initiator at a content of more than 0% by mass and 0.1% by mass or less (hereinafter, also referred to as a "specific ink"). In the present disclosure, it is preferable that the specific ink does not substantially include a polymerization initiator.

In the ink jet recording method of the present disclosure, at least one specific ink may be used but all inks to be used are preferably specific inks.

The specific ink used in the present disclosure is a solvent ink that is curable with an electron beam.

The specific ink does not include a polymerization initiator or the content of a polymerization initiator is more than 0% by mass and 0.1% by mass or less with respect to the total mass of the specific ink. It is preferable that the specific ink does not include a polymerization initiator or the content of a polymerization initiator is more than 0% by mass and 0.05% by mass or less with respect to the total mass of the specific ink. It is particularly preferable that the specific ink does not include a polymerization initiator. By adopting the above aspect, it is possible to obtain a printed material in which there are little odor and migration of the ink composition.

It is preferable that the specific ink does not contain water as much as possible.

In addition, it is preferable that the specific ink does not include an ethylenically unsaturated compound having a molecular weight of less than 1,000, or a content of an ethylenically unsaturated compound having a molecular weight of less than 1,000 is more than 0% by mass and 0.1% by mass or less with respect to the total mass of the specific ink. That is, it is preferable that the specific ink does not substantially include an ethylenically unsaturated compound having a molecular weight of less than 1,000, it is more preferable that the specific ink does not include an ethylenically unsaturated compound having a molecular weight of less than 1,000, or the content of an ethylenically unsaturated compound having a molecular weight of less than 1,000 is more than 0% by mass and 0.05% by mass or less with respect to the total mass of the specific ink, and it is particularly preferable that the specific ink does not include an ethylenically unsaturated compound having a molecular weight of less than 1,000. By adopting the above aspect, it is possible to obtain a printed material in which there are little odor and migration of the ink composition.

Further, it is preferable that the specific ink does not include water, or a content of water is more than 0% by mass and 5% by mass or less with respect to the total mass of the specific ink, it is more preferable that the specific ink does not include water, or the content of water is more than 0% by mass and 1% by mass or less with respect to the total mass of the specific ink, and it is even more preferable that the specific ink does not include water, or the content of water is more than 0% by mass and 0.1% by mass or less with respect to the total mass of the specific ink.

<Organic Solvent>

The specific ink includes an organic solvent.

The organic solvent is not particularly limited but preferably has low toxicity. In addition, a solvent having less odor is preferable. Further, a solvent whose volatile organic compounds (VOC) are not regulated by the United States Environmental Protection Agency or European Council is also preferable.

The molecular weight of the organic solvent is preferably less than 1,000, more preferably 500 or less, even more preferably 50 to 500, and particularly preferably 100 to 300.

Preferable examples of the organic solvent include a glycol ether compound, a carbonate compound, a lactone compound, and a mixture thereof, and more preferable examples thereof include a glycol ether compound, a carbonate compound, and a mixture thereof. Particularly preferable examples thereof include a mixture of a glycol ether compound and a carbonate compound. By adopting the above aspect, it is possible to obtain a printed material in which there are little odor and migration of the ink composition and excellent alcohol resistance and high temperature resistance are exhibited.

In addition, from the viewpoint of adhesiveness with a polyvinyl chloride base material, it is preferable that the organic solvent includes at least a lactone compound.

Specific examples of the glycol ether compound include ethylene glycol dimethyl ether, ethylene glycol diethyl ether, ethylene glycol dibutyl ether, diethylene glycol diethyl ether, diethylene glycol dimethyl ether, diethylene glycol dibutyl ether, propylene glycol dimethyl ether, propylene glycol diethyl ether, propylene glycol dibutyl ether, ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monoethyl ether, propylene glycol monobutyl ether, tripropylene glycol monomethyl ether, dipropylene glycol monomethyl ether, dipropylene glycol dimethyl ether, ethylene glycol monomethyl ether acetate, diethylene glycol monoethyl ether acetate, diethylene glycol monobutyl ether acetate, triethylene glycol monomethyl ether, triethylene glycol monoethyl ether, triethylene glycol monobutyl ether, ethylene glycol monophenyl ether, and propylene glycol monophenyl ether. Among these, a dialkylene glycol dialkyl ether compound is preferable, ethylene glycol dibutyl ether, propylene glycol diethyl ether, and diethylene glycol diethyl ether are more preferable, and diethylene glycol diethyl ether is particularly preferable.

Specific examples of the carbonate compound include propylene carbonate, ethylene carbonate, diethyl carbonate, ethyl methyl carbonate, dimethyl carbonate, and diphenyl carbonate. Among these, at least one compound selected from the group consisting of propylene carbonate and ethylene carbonate is more preferable and propylene carbonate is particularly preferable.

Specific examples of the lactone compound include γ-butyrolactone and δ-valerolactone. Among these, γ-butyrolactone is preferable.

In addition, as the organic solvent, a dibasic ester compound is preferably exemplified.

As the dibasic ester compound, a compound represented by Formula S1 is preferably exemplified.

Formula S1

In Formula S1, $A^S$ represents $-(CH_2)_{1\sim 6}-$, and $R^{S1}$ and $R^{S2}$ each independently represent a linear or branched alkyl group having 1 to 4 carbon atoms.

$R^{S1}$ and $R^{S2}$ preferably each independently represent a methyl group or an ethyl group and more preferably each independently represent a methyl group.

The organic solvents may be used singly or in combination of two or more thereof.

The content of the organic solvent in the specific ink is preferably 10% to 95% by mass, more preferably 50% to 92% by mass, even more preferably 65% to 90% by mass, and particularly preferably 70% to 85% by mass with respect to the total mass of the specific ink.

<Oligomer Having Ethylenically Unsaturated Group>

The specific ink includes an oligomer having an ethylenically unsaturated group.

The oligomer in the present disclosure is a compound having a weight-average molecular weight (Mw) of 1,000 or more and less than 10,000.

In addition, the oligomer having an ethylenically unsaturated group preferably has a molecular weight of 1,000 or more.

The ethylenically unsaturated group in the oligomer having an ethylenically unsaturated group is not particularly limited but a (meth)acryloxy group is preferable.

The number of ethylenically unsaturated groups in the oligomer having an ethylenically unsaturated group is not particularly limited but is preferably 2 to 100, more preferably 2 to 20, and even more preferably 3 to 6.

The oligomer having an ethylenically unsaturated group may be any oligomer as long as the oligomer has an ethylenically unsaturated group. However, a compound selected from the group consisting of a urethane acrylate oligomer, a polyester acrylate oligomer, and an epoxy acrylate oligomer is preferable, a compound selected from the group consisting of a urethane acrylate oligomer and an epoxy acrylate oligomer is more preferable, and a urethane acrylate oligomer is particularly preferable.

Here, the term "acrylate oligomer" in the present disclosure includes not only an oligomer having an acryloxy group but also an oligomer having a methacryloxy group.

Preferable examples of the urethane acrylate oligomer include an aliphatic urethane acrylate oligomer and an aromatic urethane acrylate oligomer, and more preferable examples thereof include an aliphatic urethane acrylate oligomer.

By containing urethane acrylate in the ink, it is possible to obtain an ink having excellent adhesiveness to the base material and to obtain a printed material having further excellent alcohol resistance and high temperature resistance.

In addition, the urethane acrylate oligomer is preferably a bi- to hexafunctional urethane acrylate oligomer and more preferably a tri- to hexafunctional urethane acrylate oligomer.

Preferable examples of the epoxy acrylate oligomer include a bisphenol A epoxy acrylate oligomer and an epoxy novolac acrylate oligomer.

With respect to the oligomer, "Origomar Handobukku (Oligomer Handbook)" (edited by Junji Furukawa, The Chemical Daily Co., Ltd.) may also be referred to.

Examples of commercial products of the oligomer having an ethylenically unsaturated group include the followings.

Examples of urethane acrylate include SHIKOH series manufactured by THE NIPPON SYNTHETIC CHEMICAL INDUSTRY CO., LTD., R1204, R1211, R1213, R1217, R1218, R1301, R1302, R1303, R1304, R1306, R1308, R1901, and R1150 manufactured by Dai-Ichi Kogyo Seiyaku Co., Ltd., EBECRYL series (for example, EBECRYL 210, 230, 270, 4858, 8402, 8804, 8807, 8803, 9260, 1290, 1290K, 5129, 4842, 8210, 210, 4827, 6700, 4450, and 220) manufactured by Daicel-Cytec Company Ltd., NK OLIGO U-15HA, U-33H, U-53H, and U-200PA manufactured by Shin-Nakamura Chemical Co., Ltd., ARONIX M-1100, M-1200, M-1210, M-1310, M-1600, and M-1960 manufactured by Toagosei Co., Ltd., and CN964 A85 manufactured by Sartomer Company Inc.

Examples of polyester acylate include EBECRYL series (for example, EBECRYL 770, IRR467, 81, 84, 83, 80, 675, 800, 810, 812, 1657, 1810, IRR302, 450, 670, 830, 870, 1830, 1870, 2870, IRR267, 813, and IRR483 and 811) manufactured by Daicel-Cytec Company Ltd., and ARONIX M-6100, M-6200, M-6250, M-6500, M-7100, M-8030, M-8060, M-8100, M-8530, M-8560, and M-9050 manufactured by Toagosei Co., Ltd.

Examples of epoxy acylate include UVE2500-TP20 manufactured by Polymer Technologies, and EBECRYL series (for example, EBECRYL 860, 2958, 3411, 3600, 3605, 3708, and RDX63182 and 6040) manufactured by Daicel-Cytec Company Ltd.

The oligomers having an ethylenically unsaturated group may be used singly or in combination of two or more thereof.

The content of the oligomer having an ethylenically unsaturated group in the specific ink is preferably 1% to 50% by mass, more preferably 5% to 30% by mass, and even more preferably 5% to 25% by mass with respect to the total mass of the specific ink.

In addition, the content of the oligomer having an ethylenically unsaturated group in the specific ink is preferably 10% to 98% by mass, more preferably 30% to 95% by mass, and particularly preferably 50% to 90% by mass with respect to the total solid content of the specific ink.

The total solid content in the specific ink refers to an amount excluding the organic solvent and water.

The content of the oligomer having an ethylenically unsaturated group in the specific ink is preferably 99% by mass or more, more preferably 99.5% by mass or more, even more preferably 99.9% by mass or more, and particularly preferably 100% by mass with respect to the total mass of the ethylenically unsaturated compound (the compound having an ethylenically unsaturated group) in the specific ink.

<Pigment>

The specific ink includes a pigment.

The pigment is not particularly limited and a known pigment may be used.

As the pigment, it is preferable to select a compound not functioning as a polymerization inhibitor from the viewpoint of not lowering the sensitivity of a curing reaction by an electron beam.

The pigment that can be used in the present disclosure is not particularly limited but for example, organic and inorganic pigments having the numbers below described in the Color Index can be used.

As a red or magenta pigment, Pigment Red 3, 5, 19, 22, 31, 38, 42, 43, 48:1, 48:2, 48:3, 48:4, 48:5, 49:1, 53:1, 57:1, 57:2, 57:3, 58:4, 63:1, 81, 81:1, 81:2, 81:3, 81:4, 88, 104, 108, 112, 122, 123, 144, 146, 149, 166, 168, 169, 170, 177, 178, 179, 184, 185, 202, 208, 216, 226, and 257, Pigment Violet 3, 19, 23, 29, 30, 37, 50, and 88, and Pigment Orange 13, 16, 20, and 36, as a blue or cyan pigment, Pigment Blue 1, 15, 15:1, 15:2, 15:3, 15:4, 15:6, 16, 17-1, 22, 27, 28, 29, 36, and 60, as a green pigment, Pigment Green 7, 26, 36, and 50, as a yellow pigment, Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, and 193, as a black pigment, Pigment Black 7, 28, and 26, as a white pigment, Pigment White 6, 18, and 21, and the like can be used according to the purpose.

It is preferable that the pigment is added to the specific ink and then is appropriately dispersed in the ink. For the dispersion of the pigment, for example, various dispersing devices, such as a ball mill, a sand mill, an attritor, a roll mill, an agitator, a HENSCHEL mixer, a colloid mill, an ultrasound homogenizer, a pearl mill, a wet-type jet mill, or a paint shaker, may be used.

The pigment may be directly added together with each component during the preparation of the specific ink. In addition, in order to improve dispersibility, the pigment can be mixed after the pigment is added to a solvent or a dispersion medium such as the polymerizable compound used in the present disclosure in advance and is uniformly dispersed or dissolved.

In the present disclosure, in order to avoid deterioration in solvent resistance in a case where a solvent remains in a cured image, and a problem of VOC of the remaining solvent, it is preferable that the pigment is added to a dispersion medium such as the organic solvent or the oligomer having an ethylenically unsaturated group in advance and then mixed. One or two or more pigments may be appropriately selected and used according to the purpose of use of the specific ink.

In a case of using a pigment such as a pigment which remains in the form of solid in the specific ink, it is preferable to select the kinds of a pigment, a dispersant, and a dispersion medium and set dispersion conditions and filtration conditions such that the average particle diameter of the pigment particles is preferably 0.005 to 0.5 µm, more preferably 0.01 to 0.45 µm, and even more preferably 0.015 to 0.4 µm. By this control of the particle diameter, clogging of a head nozzle is suppressed and the storage stability of ink and the transparency and curing sensitivity of ink can be maintained. Thus, this case is preferable.

The content of the colorant in the specific ink is appropriately selected according to the color and the purpose of use and is preferably 0.01% to 30% by mass with respect to the total mass of the specific ink.

<Dispersant>

In the present disclosure, the specific ink preferably includes a dispersant.

The dispersant is preferably a polymer dispersant. The term "polymer dispersant" in the present disclosure means a dispersant having a weight-average molecular weight of 1,000 or more.

The dispersant is preferably a compound not having an ethylenically unsaturated group.

Examples of the polymer dispersant include Disperbyk-101, Disperbyk-102, Disperbyk-103, Disperbyk-106, Disperbyk-111, Disperbyk-161, Disperbyk-162, Disperbyk-163, Disperbyk-164, Disperbyk-166, Disperbyk-167, Disperbyk-168, Disperbyk-170, Disperbyk-171, Disperbyk-174, and Disperbyk-182 (manufactured by BYK Chemie GmbH); EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, EFKA7580, EFKA7701, and EFKA7731 (manufactured by EFKA Additives Co., Ltd.); DISPERSE AID 6, DISPERSE AID 8, DISPERSE AID 15, and DISPERSE AID 9100 (manufactured by San Nopco Co., Ltd.); various SOLSPERSE dispersants such as 3000, 5000, 9000, 12000, 13240, 13940, 17000, 22000, 24000, 26000, 28000, 32000, 36000, 39000, 41000, and 71000

(manufactured by Noveon, Inc.); ADEKA PLURONIC L31, F38, L42, L44, L61, L64, F68, L72, P95, F77, P84, F87, P94, L101, P103, F108, L121, and P-123 (manufactured by ADEKA Ltd.), IONETTO S-20 (manufactured by Sanyo Chemical Industries, Ltd.); DISPARLON KS-860, 873 SN, and 874 (polymer dispersant), #2150 (aliphatic polycarboxylic acid), and #7004 (polyether ester type) (manufactured by Kusumoto Kasei Co., Ltd.).

The dispersants may be used singly, or in combination of two or more thereof.

The content of the dispersant is appropriately selected according to the purpose of use of the specific ink and is preferably 0.05% to 15% by mass with respect to the total mass of the specific ink.

<Surfactant>

The specific ink may include a surfactant since stabilized jettability for a long period of time is imparted.

Examples of the surfactant include those described in each of JP1987-173463A (JP-S62-173463A) and JP1987-183457A (JP-S62-183457A). Examples thereof include anionic surfactants such as dialkylsulfosuccinic acid salts, alkylnaphthalenesulfonic acid salts, and fatty acid salts, nonionic surfactants such as polyoxyethylene alkyl ethers, polyoxyethylene alkyl allyl ethers, acetylene glycols, and polyoxyethylene-polyoxypropylene block copolymers, and cationic surfactants such as alkylamine salts and quaternary ammonium salts. In addition, a fluorine-based surfactant (for example, an organic fluoro compound) or a silicone-based surfactant (for example, a polysiloxane compound) may also be used as the surfactant. It is preferable that the organic fluoro compound is hydrophobic. Examples of the organic fluoro compound include fluorine-based surfactants, oil-like fluorine-based compounds (for example, fluorine oil), and solid-like fluorine compound resins (for example, tetrafluoroethylene resin), and those described in JP1982-9053B (JP-S57-9053B, pages 8 to 17) and JP1987-135826A (JP-S62-135826A) may be mentioned.

It is preferable that the polysiloxane compound is a modified polysiloxane compound having an organic group introduced into some of the methyl groups of dimethylpolysiloxane. Examples of the modification include polyether modification, methylstyrene modification, alcohol modification, alkyl modification, aralkyl modification, fatty acid ester modification, epoxy modification, amine modification, amino modification, and mercapto modification. However, the modification is not particularly limited to these. These methods for modification may also be used in combination. In addition, among these, a polyether-modified polysiloxane compound is preferable from the viewpoint of improving jetting stability in ink jetting.

Examples of the polyether-modified polysiloxane compound include SILWET L-7604, SILWET L-7607N, SILWET FZ-2104, and SILWET FZ-2161 (manufactured by NUC Corporation), BYK306, BYK307, BYK331, BYK333, BYK347, BYK348, and the like (manufactured by BYK Chemie GmbH), KF-351A, KF-352A, KF-353, KF-354L, KF-355A, KF-615A, KF-945, KF-640, KF-642, KF-643, KF-6020, X-22-6191, X-22-4515, KF-6011, KF-6012, KF-6015, and KF-6017 (manufactured by Shin-Etsu Chemical Co., Ltd.), and Tegoglide 410 (manufactured by Evonik Tego Chemie GmbH).

Among these, the surfactant is preferably a silicone-based surfactant.

The surfactants may be used singly or in combination of two or more thereof.

The content of the surfactant is appropriately selected according to the purpose of use and is preferably 0.0001% to 5% by mass and more preferably 0.001% to 2% by mass with respect to the total mass of the specific ink.

<Polymerization Inhibitor>

The specific ink may include a polymerization inhibitor from the viewpoint of increasing storability and suppressing head clogging.

Examples of the polymerization inhibitor include a nitroso-based polymerization inhibitor, a hindered amine-based polymerization inhibitor, a hindered phenol-based polymerization inhibitor, hydroquinone, benzoquinone, p-methoxyphenol, TEMPO, TEMPOL, cupferron Al.

The polymerization inhibitors may be used singly or in combination of two or more thereof.

The content of the polymerization inhibitor is preferably 0.001% to 2% by mass, more preferably 0.01% to 1% by mass, and particularly preferably 0.02% to 0.8% by mass with respect to the total mass of the specific ink.

<Other Components>

The specific ink may include an ultraviolet absorber, an antioxidant, a discoloration preventer, conductive salts, a basic compound, and the like, as necessary, in addition to the respective components. As these other components, known additives can be used and examples thereof include those described in JP2009-221416A.

In addition, in the specific ink is preferably an ink in which the total content of an organic solvent, an oligomer having an ethylenically unsaturated group, and a pigment, and arbitrarily, a dispersant, a surfactant, and a polymerization inhibitor is 99% by mass or more, and more preferably an ink including an organic solvent, an oligomer having an ethylenically unsaturated group, and a pigment, and arbitrarily, a dispersant, a surfactant, and a polymerization inhibitor.

<Physical Properties of Specific Ink>

In the present disclosure, it is preferable to use a specific ink having a viscosity at 25° C. of 40 mPa·s or less in consideration of jettability. The viscosity of the specific ink is more preferably 3 to 30 mPa·s, even more preferably 5 to 25 mPa·s, and particularly preferably 8 to 15 mPa·s. In addition, the viscosity at jetting temperature (preferably at 25° C. to 80° C., more preferably 25° C. to 50° C.) is preferably 1 to 15 mPa·s and more preferably 5 to 13 mPa·s. It is preferable to adjust the compositional ratio of the specific ink appropriately such that the viscosity is in the above range. By setting the viscosity at room temperature (25° C.) to be high, even in a case of using a porous base material (recording medium, support), permeation of the specific ink into the base material is avoided so that odor and migration of the ink composition can be reduced. Further, ink bleeding at the time of landing of the liquid droplets of the specific ink can be suppressed and as result, image quality is improved. Thus, this case is preferable.

The viscosity in the present disclosure is measured using an E type viscosity meter (manufactured by Toki Sangyo Co., Ltd.).

(Ink Jet Recording Device)

The ink jet recording device of the present disclosure includes a base material transporting device in which an ink jet head, drying means, and an electron beam source are sequentially arranged, and an ink including an organic solvent, an oligomer having an ethylenically unsaturated group, and a pigment, and not including a polymerization initiator or including a polymerization initiator at a content of more than 0% by mass and 0.1% by mass or less.

The ink in the ink jet recording method of the present disclosure has the same meaning as the specific ink and the preferable aspect is also the same.

In addition, a preferable aspect of the ink jet recording device of the present disclosure is the same as the preferable aspect of the ink jet recording device used in the ink jet recording method of the present disclosure described above.

In addition, the ink jet recording device of the present disclosure is preferably a single pass type ink jet recording device.

In the base material transporting device in the ink jet recording device of the present disclosure, an ink jet head, drying means, and an electron beam source are sequentially arranged from the upstream to the downstream of the base material in the transport direction.

For the ink jet head, the drying means, and the electron beam source, known ink jet heads, drying means, electron beam sources, and base material transporting devices can be used respectively.

The acceleration voltage of the electron beam in the electron beam source is preferably 150 kV or less, more preferably 30 to 150 kV, even more preferably 50 to 130 kV, particularly preferably 70 to 110 kV, and most preferably 80 to 110 kV. In a case where the acceleration voltage is in the above range, generation of a low molecular weight compound derived from the base material can be suppressed and odor and heptane extract can be further reduced in a printed material to be obtained.

In addition, the dried ink is preferably curable at an absorbed dose of the electron beam of 30 kGy or less, more preferably curable at an absorbed dose of 5 to 30 kGy, and particularly preferably curable at an absorbed dose of 10 to 30 kGy. In a case where the absorbed dose is in the above range, generation of a low molecular weight compound derived from the base material can be suppressed. Thus, odor and heptane extract are further reduced in a printed material to be obtained, energy efficiency is excellent, and excellent economic efficiency is obtained.

All inks included in the ink jet recording device of the present disclosure are preferably inks including an organic solvent, an oligomer having an ethylenically unsaturated group, and a pigment, and not including a polymerization initiator or including a polymerization initiator at a content of more than 0% by mass and 0.1% by mass or less (specific inks).

The ink jet recording device of the present disclosure preferably has a hydrophilization treatment machine for making the surface of the base material hydrophilic, and more preferably has a corona treatment machine. In the above aspect, even in a case of using a base material which is not subjected to a hydrophilization treatment, adhesiveness between the base material and the ink and image quality in a printed material to be obtained are improved.

In addition, the ink jet recording device of the present disclosure preferably includes a base material transporting device in which a hydrophilization treatment machine, an ink jet head, drying means, and an electron beam source are sequentially arranged, and more preferably includes a base material transporting device in which a corona treatment machine, an ink jet head, drying means, and an electron beam source are sequentially arranged.

Further, the drying means in the ink jet recording device of the present disclosure preferably has at least a heating dryer, and is more preferably a heating dryer. In the above aspect, drying properties are excellent and cost and space saving is also excellent.

The base material transporting device in the ink jet recording device of the present disclosure is preferably a roll to roll type transporting device.

Figure 1:
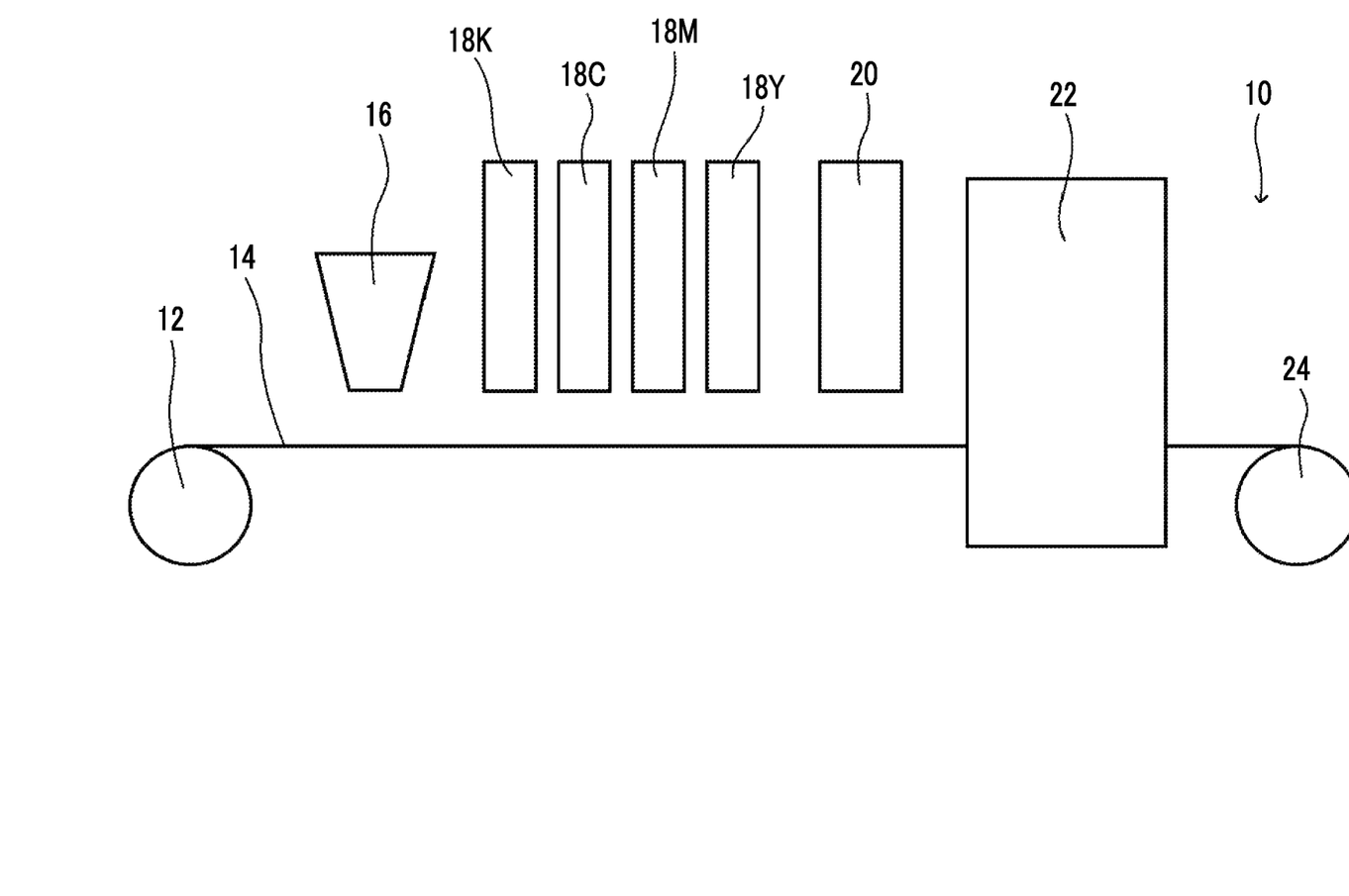
FIG. 1 is a schematic view showing an example of an ink jet recording device suitably used for an embodiment of the present invention.

FIG. 1 is a schematic view showing an example of an ink jet recording device preferably used in the present disclosure.

An ink jet recording device 10 shown in FIG. 1, a base material 14 stretched by a feeding roller 12 and a winding roller 24, which is means for transporting the base material 14, is transported from the feeding roller 12 to the winding roller 24. First, the surface of the base material 14 is subjected to a corona treatment by a corona treatment machine 16. Subsequently, each color ink (K: black, Y: yellow, M: magenta, C: cyan) is jetted from ink jet heads 18K, 18C, 18M, and 18Y, which jet each color ink, at least a part of the organic solvent is removed from the jetted black, yellow, magenta, and cyan inks by a heating dryer 20, which is placed just behind the ink jet head 18Y and is drying means, and the inks are dried. Finally, an electron beam is applied to the base material by an electron beam (EB) curing device 22 to cure the dried inks.

The EB curing device 22 has, for example, an electron beam source which is surrounded by an inert gas blanket and is connected to an inert gas generating device via an inert gas pipe. In a case where the inert gas generating device is operated, the air in the blanket is preferably substituted with the inert gas. It is possible to use nitrogen or the like as the inert gas.

(Printed Material)

The printed material of the present disclosure is a printed material formed by using the ink jet recording method of the present disclosure or a printed material formed by using the ink jet recording device of the present disclosure.

In addition, the printed material of the present disclosure preferably has an adhesive layer and a laminate film on the printed material formed by using the ink jet recording method of the present disclosure or the printed material formed by using the ink jet recording device of the present disclosure in this order.

The adhesive layer and the laminate film have the same meaning as the adhesive layer and the laminate film described in the laminate step and the preferable aspects are also the same.

EXAMPLES

Hereinafter, embodiments of the present invention will be more specifically described with reference to examples and comparative examples. However, the present disclosure should not be construed as being limited by these examples. Unless otherwise specified, "part(s)" means "part(s) by mass" and "%" means "% by mass" in the following description.

In addition, unless otherwise specified, a molar light absorption coefficient in the examples is a molar light absorption coefficient in an ultraviolet ray at a wavelength of 300 nm and is a value measured by the above method.

Materials used in the examples are as shown below.

<Pigment>

IRGALITE BLUE GLVO (cyan pigment, manufactured by BASF SE)

CINQUASIA MAGENTA RT-355-D (magenta pigment, manufactured by BASF SE)

NOVOPERM YELLOW H2G (yellow pigment, manufactured by Clariant)

SPECIAL BLACK 250 (black pigment, manufactured by BASF SE)

IRGALITE RED D3773 (magenta pigment, manufactured by BASF SE)

HELIOGEN BLUE D 7110 F (cyan pigment, manufactured by BASF SE)
SP BLACK 250 FLUFFY (black pigment, manufactured by Orion CO., Ltd.)
<Dispersant>
Disperbyk 168 (manufactured by BYK Chemie GmbH)
EFKA 7701 (manufactured by BASF SE)
Solsperse 5000 (manufactured by Lubrizol Corporation)
Solsperse 32000 (manufactured by Lubrizol Corporation)
<Organic Solvent>
Diethylene glycol diethyl ether (manufactured by Tokyo Chemical Industry Co., Ltd.)
Propylenecarbonate (manufactured by Tokyo Chemical Industry Co., Ltd.)
γ-butyrolactone (manufactured by Tokyo Chemical Industry Co., Ltd.)
Ethylene glycol dibutyl ether (manufactured by Tokyo Chemical Industry Co., Ltd.)
Propylene glycol diethyl ether (manufactured by Tokyo Chemical Industry Co., Ltd.)
<Actinic Ray Curable Oligomer>
UVE2500-TP20: epoxy novolak acrylate oligomer (manufactured by Polymer Technologies)
Nippon Gohsei 7630B: hexafunctional urethane acrylate (SHIKOH UV-7630B, Mw: 2,200, manufactured by The Nippon Synthetic Chemical Industry Co., Ltd.)
EBECRYL 230: aliphatic urethane acrylate (Mw: 5,000, manufactured by Daicel-Cytec Company Ltd.)
EBECRYL 3708: modified epoxy acrylate (Mw: 1,500, manufactured by Daicel-Cytec Company Ltd.)
EBECRYL 1870: polyester acrylate (Mw: 1,500, manufactured by Daicel-Cytec Company Ltd.)
EBECRYL 210: aromatic urethane acrylate (Mw: 1,500, manufactured by Daicel-Cytec Company Ltd.)
<Polymerization Initiator>
Isopropyl thioxanthone: isopropyl thioxanthone, Speed Cure ITX, manufactured by Lamb son limited
Irgacure 369: 2-benzyl-2-dimethylamino-1-(4-morpholinophenyl)butan-1-one (manufactured by BASF SE)
Irgacure 819: bis(2,4,6-trimethylbenzoyl)phenylphosphine oxide (manufactured by BASF SE)
Irgacure 2959: 1-[4-(2-hydroxyethoxy)phenyl]-2-hydroxy-2-methyl-1-propane-1-one (manufactured by BASF SE)
<Monomer>
NPGPODA: propylene oxide modified neopentyl glycol diacrylate, SR9003, manufactured by Sartomer Company Inc.
SR341: 3-methyl-1,5-pentanediol diacrylate (manufactured by Sartomer Company Inc.)
SR344: polyethylene glycol (400) diacrylate (manufactured by Sartomer Company Inc.)
<Other Additives>
Tego Glide 410: polyether siloxane copolymer (manufactured by Evonik Tego Chemie GmbH)
BYK 307: silicone-based surfactant (manufactured by BYK Chemie GmbH)
UV 12: polymerization inhibitor (FLORSTAB UV-12 manufactured by Kromachem Ltd.)
UV 22: 4-benzylidene-2,6-di-tert-butyl-cyclohexane-2,5-dienone, polymerization inhibitor, Irgastab UV 22, manufactured by BASF SE
VINYL CHLORIDE/VINYL ACETATE COPOLYMER (vinyl chloride-vinyl acetate copolymer, manufactured by Sigma-Aldrich Inc.)
<Preparation of Cyan Mill Base A>
300 parts by mass of IRGALITE BLUE GLVO, 500 parts by mass of diethylene glycol diethyl ether, and 200 parts by mass of Disperbyk 168 were stirred and mixed, and thus a cyan mill base A was obtained. The preparation of the cyan mill base A was carried out by putting the materials into an M50 disperser motor mill (manufactured by Eiger Machinery, Inc.), and dispersing the mixture using zirconia beads having a diameter of 0.65 mm at a circumferential speed of 9 m/s for 4 hours.

<Preparation of Magenta Mill Base B, Yellow Mill Base C, and Black Mill Base D>
A magenta mill base B, a yellow mill base C, and a black mill base D were prepared in the same manner as the preparation of the cyan mill base A except that the compositions shown in Table 1 were adopted.

TABLE 1

|  | Cyan mill base A | Magenta mill base B | Yellow mill base C | Black mill base D |
| --- | --- | --- | --- | --- |
| IRGALITE BLUE GLVO | 300 | — | — | — |
| Cinquasia Magenta RT-355-D | — | 300 | — | — |
| NOVOPERM YELLOW H2G | — | — | 300 | — |
| Special Black 250 | — | — | — | 400 |
| Diethylene glycol diethyl ether | 500 | 600 | 475 | 291 |
| Disperbyk 168 | 200 | 100 | — | 300 |
| EFKA 7701 | — | — | 225 | — |
| Solsperse 5000 | — | — | — | 9 |
| Total (parts by mass) | 1,000 | 1,000 | 1,000 | 1,000 |

Example 1

<Preparation of Ink>
Each material was stirred and mixed at the ratios shown in Table 2 using a mixer (L4R manufactured by Silverson Machines, Inc.) at room temperature (25° C.) and a rotation speed of 4,000 revolutions/minute for 20 minutes, and thus inks Ex 1 to 8 were respectively prepared. The unit of the content of each component shown in Table 2 is parts by mass.

TABLE 2

|  | Ink No. | | | | | | | |
| --- | --- | --- | --- | --- | --- | --- | --- | --- |
|  | Ex 1 | Ex 2 | Ex 3 | Ex 4 | Ex 5 | Ex 6 | Ex 7 | Ex 8 |
| Color of ink | Black | Cyan | Magenta | Yellow | Black | Cyan | Magenta | Yellow |
| Diethylene glycol diethyl ether | 48.37 | 50.37 | 51.38 | 52.27 | 51.0 | 51.3 | 49.3 | 50.3 |
| Propylene carbonate | 26.48 | 26.48 | 22.18 | 24.19 | 26.5 | 26.7 | 25.5 | 26.0 |
| UVE2500-TP20 | 19.12 | 17.12 | 15.76 | 10.11 | — | — | — | — |
| Nippon Gohsei 7630B | — | — | — | — | 16.5 | 16.0 | 14.0 | 10.3 |

TABLE 2-continued

| | Ink No. | | | | | | | |
|---|---|---|---|---|---|---|---|---|
| | Ex 1 | Ex 2 | Ex 3 | Ex 4 | Ex 5 | Ex 6 | Ex 7 | Ex 8 |
| Tegoglide 410 | 0.03 | 0.03 | 0.03 | 0.03 | — | — | — | — |
| Cyan mill base A | — | 6.0 | — | — | — | 6.0 | — | — |
| Magenta mill base B | — | — | 10.65 | — | — | — | 11.2 | — |
| Yellow mill base C | — | — | — | 13.4 | — | — | — | 13.4 |
| Black mill base D | 6.0 | — | — | — | 6.0 | — | — | — |
| Viscosity of ink (mPa · s) | 6.16 | 6.26 | 6.16 | 6.28 | 5.92 | 6.03 | 5.88 | 6.09 |

Using the device shown in FIG. 1, an image was drawn on a polyethylene terephthalate (PET) base material with the ink and the ink was dried. Then, the ink was cured using an electron beam (EB) curing device EZ Cure I (manufactured by Iwasaki Electric Co., Ltd.) and thus a printed material was obtained. At this time, nitrogen purge was performed such that the oxygen concentration around the printed material was 300 ppm or less. The acceleration voltage of the electron beam was set to 110 kV and irradiation was performed such that the absorbed dose of the electron beam of the ink on the base material was 30 kGy.

As the ink jet head, Samba head (having a nozzle density of 1,200 npi, a minimum ink droplet size of 2 pl, and a jetting amount of 4 gradations, manufactured by Fujifilm Dimatix (without gradation in jetting amount, small droplet: 2 pl, middle droplet: 7 pl, large droplet: 9 pl)) was used.

As the base material, a TAIKO polyester film FE2001 (having a thickness of 12 μm, manufactured by Futamura Chemical Co., Ltd.) was used. The transport speed of the base material was set to 50 m/min.

<Evaluation>

1. Odor

An image with a halftone dot area ratio of 100% at a resolution of 1,200 dpi×1,200 dpi was drawn using the above device and the image was dried. Then, the cured drawn sample (printed material) was prepared. In the portion of a halftone dot area ratio of 100%, middle droplets were used 100%.

The obtained drawn sample was subjected to sensory evaluation by 20 persons and evaluated based on the following standards.

1: There is no odor.
2: There is substantially no odor.
3: There is slight odor.
4: There is some odor.
5: There is very strong odor.

2. Migration of Ink Composition (extraction amount)

A drawn sample was prepared in the same manner as in the odor evaluation.

A 100 cm² drawn sample was extracted with 50 cc of heptane, and the total amount of extract was measured. The evaluation standards based on the total amount of extract are as follows.

1: less than 5 ppb
2: 5 ppb or more and less than 10 ppb
3: 10 ppb or more and less than 100 ppb
4: 100 ppb or more and less than 1 ppm
5: 1 ppm or more 3. Alcohol Resistance A drawn sample was prepared in the same manner as in the odor evaluation.

100% ethanol liquid was applied to a cotton swab, and the surface of the obtained drawn sample was rubbed with the cotton swab. The evaluation standards are as follows.

1: Color fading cannot be confirmed in the sample. There is no color migration in the cotton swab.
2: Color fading cannot be confirmed in the sample. There is color migration in the cotton swab.
3: Color fading can be confirmed in the sample. There is color migration in the cotton swab.
4: Color fading can be confirmed in the sample, and the surface of the base material is exposed. There is color migration in the cotton swab.

4. High Temperature Resistance

A drawn sample was prepared in the same manner as in the odor evaluation.

Boiling was performed in hot water at 120° C. under high pressure (2 atmospheres) for 4 minutes. The evaluation standards are as follows.

1: There is completely no change. Even in a case where paper (C2 paper, manufactured by Fuji Xerox Co., Ltd.) is pressed on the printed material immediately after boiling, there is no color migration.
2: Slight bleeding is generated in the image but is not noticeable. Even in a case where paper (C2 paper, manufactured by Fuji Xerox Co., Ltd.) is pressed on the printed material immediately after boiling, there is no color migration.
3: Bleeding is generated. In a case where paper (C2 paper, manufactured by Fuji Xerox Co., Ltd.) is pressed on the printed material immediately after boiling, there is color migration.

5. Line Quality

Each color line of 0.05 pt was drawn and evaluation was performed based on the following viewpoints.

1: An image can be drawn with a line width of less than 30 μm. The line width is uniform.
2: The line width is 30 μm or more. The line width is uniform.
3: The line width is 30 μm or more, and the line width is not uniform.

The inks Ex 1 to 4, or the inks Ex 5 to 8 were used and the above evaluations were performed. The evaluation results are shown in Table 3.

TABLE 3

| Ink | Black ink | Ex 1 | Ex 5 |
|---|---|---|---|
| | Cyan ink | Ex 2 | Ex 6 |
| | Magenta ink | Ex 3 | Ex 7 |
| | Yellow ink | Ex 4 | Ex 8 |
| Evaluation results | Odor | 1 | 1 |
| | Extraction amount | 1 | 1 |
| | Alcohol resistance | 1 | 1 |
| | High temperature resistance | 1 | 1 |
| | Line quality | 1 | 1 |

<Jettability>

In addition, in a case where printing with a halftone dot area ratio of 100% was continuously performed for 2 minutes using the inks Ex 1 to Ex 8, it was possible to confirm that good printing could be performed from the start to the end.

Comparative Example 1

A drawn sample was prepared in the same manner as in Example 1 using inks CE 1 to 4 or inks CE 5 to 8 shown in Table 4 as inks, and evaluated. The evaluation results are shown in Table 5.

TABLE 4

|  | Ink No. | | | | | | | |
|---|---|---|---|---|---|---|---|---|
|  | CE 1 | CE 2 | CE 3 | CE 4 | CE 5 | CE 6 | CE 7 | CE 8 |
| Color of ink | Black | Cyan | Magenta | Yellow | Black | Cyan | Magenta | Yellow |
| Diethylene glycol diethyl ether | 45.37 | 44.37 | 45.38 | 46.27 | 45.0 | 45.3 | 43.3 | 44.3 |
| Propylene carbonate | 26.48 | 26.48 | 22.18 | 24.19 | 26.5 | 26.7 | 25.5 | 26.0 |
| UVE2500-TP20 | 19.12 | 17.12 | 15.76 | 10.11 | — | — | — | — |
| Nippon Gohsei 7630B | — | — | — | — | 16.5 | 16.0 | 14.0 | 10.3 |
| Tegoglide 410 | 0.03 | 0.03 | 0.03 | 0.03 | — | — | — | — |
| Isopropyl thioxanthone | 1.0 | — | — | — | — | — | — | — |
| Irgacure 369 | 2.0 | — | — | — | — | — | — | — |
| Irgacure 819 | — | 4.0 | 4.0 | 4.0 | 4.0 | 4.0 | 4.0 | 4.0 |
| Irgacure 2959 | — | 2.0 | 2.0 | 2.0 | 2.0 | 2.0 | 2.0 | 2.0 |
| Cyan mill base A | — | 6.0 | — | — | — | 6.0 | — | — |
| Magenta mill base B | — | — | 10.65 | — | — | — | 11.2 | — |
| Yellow mill base C | — | — | — | 13.4 | — | — | — | 13.4 |
| Black mill base D | 6.0 | — | — | — | 6.0 | — | — | — |
| Viscosity of ink (mPa · s) | 6.16 | 6.26 | 6.16 | 6.28 | 5.92 | 6.03 | 5.88 | 6.09 |

TABLE 5

| Ink | | | |
|---|---|---|---|
| Ink | Black ink | CE 1 | CE 5 |
|  | Cyan ink | CE 2 | CE 6 |
|  | Magenta ink | CE 3 | CE 7 |
|  | Yellow ink | CE 4 | CE 8 |
| Evaluation results | Odor | 4 | 4 |
|  | Extraction amount | 4 | 4 |
|  | Alcohol resistance | 1 | 1 |
|  | High temperature resistance | 1 | 1 |
|  | Line quality | 1 | 1 |

<Jettability>

In addition, in a case where printing with a halftone dot area ratio of 100% was continuously performed for 2 minutes using the inks CE1 to CE8, it was possible to confirm that good printing could be performed from the beginning to the end.

Comparative Example 2

A sample was prepared and evaluated in the same manner as in Example 1 except that the EB curing device as a light source in Example 1 was changed to a nitrogen purged LED light source (as a light source unit in which, to a LED light source (385 nm, 4 W) manufactured by HOYA CANDEO OPTRONICS, a nitrogen gas generating device 2NT-8.2 (manufactured by KOFLOC) was connected, the base material and the light source were spaced at a distance of 5 mm, and the space was filled with nitrogen gas) used in MJP20W manufactured by Miyakoshi Co., Ltd.

In a case of using such a method, polymerization did not proceed and color fading occurred immediately after contact with the sample.

Example 2

Inks Ex 9 to Ex 36 were prepared with the compositions shown in Tables 6 to 9 in the same manner as the preparation of the inks Ex 1 to Ex 8.

TABLE 6

|  | Ink No. | | | | | | | |
|---|---|---|---|---|---|---|---|---|
|  | Ex 9 | Ex 10 | Ex 11 | Ex 12 | Ex 13 | Ex 14 | Ex 15 | Ex 16 |
| Color of ink | Black | Cyan | Magenta | Yellow | Black | Cyan | Magenta | Yellow |
| γ-butyrolactone | 77.5 | 78.0 | 74.8 | 76.3 | — | — | — | — |
| Ethylene glycol dibutyl ether | — | — | — | — | 77.5 | 78.0 | 74.8 | 76.3 |
| Nippon Gohsei 7630B | 16.5 | 16.0 | 14.0 | 10.3 | 16.5 | 16.0 | 14.0 | 10.3 |
| Cyan mill base A | — | 6.0 | — | — | — | 6.0 | — | — |
| Magenta mill base B | — | — | 11.2 | — | — | — | 11.2 | — |
| Yellow mill base C | — | — | — | 13.4 | — | — | — | 13.4 |
| Black mill base D | 6.0 | — | — | — | 6.0 | — | — | — |

TABLE 7

| | Ink No. | | | | | | | |
|---|---|---|---|---|---|---|---|---|
| | Ex 17 | Ex 18 | Ex 19 | Ex 20 | Ex 21 | Ex 22 | Ex 23 | Ex 24 |
| Color of ink | Black | Cyan | Magenta | Yellow | Black | Cyan | Magenta | Yellow |
| Propylene carbonate | — | — | — | — | 51.0 | 51.3 | 49.3 | 50.3 |
| γ-butyrolactone | — | — | — | — | 26.5 | 26.7 | 25.5 | 26.0 |
| Propylene glycol diethyl ether | 77.5 | 78.0 | 74.8 | 76.3 | — | — | — | — |
| Nippon Gohsei 7630B | 16.5 | 16.0 | 14.0 | 10.3 | — | — | — | — |
| EBECRYL 230 | — | — | — | — | 16.5 | 16.0 | 14.0 | 10.3 |
| Cyan mill base A | — | 6.0 | — | — | — | 6.0 | — | — |
| Magenta mill base B | — | — | 11.2 | — | — | — | 11.2 | — |
| Yellow mill base C | — | — | — | 13.4 | — | — | — | 13.4 |
| Black mill base D | 6.0 | — | — | — | 6.0 | — | — | — |

TABLE 8

| | Ink No. | | | | | | | |
|---|---|---|---|---|---|---|---|---|
| | Ex 25 | Ex 26 | Ex 27 | Ex 28 | Ex 29 | Ex 30 | Ex 31 | Ex 32 |
| Color of ink | Black | Cyan | Magenta | Yellow | Black | Cyan | Magenta | Yellow |
| Propylene carbonate | 51.0 | 51.3 | 49.3 | 50.3 | 51.0 | 51.3 | 49.3 | 50.3 |
| γ-butyrolactone | 26.5 | 26.7 | 25.5 | 26.0 | 26.5 | 26.7 | 25.5 | 26.0 |
| EBECRYL 3708 | 16.5 | 16.0 | 14.0 | 10.3 | — | — | — | — |
| EBECRYL 1870 | — | — | — | — | 16.5 | 16.0 | 14.0 | 10.3 |
| Cyan mill base A | — | 6.0 | — | — | — | 6.0 | — | — |
| Magenta mill base B | — | — | 11.2 | — | — | — | 11.2 | — |
| Yellow mill base C | — | — | — | 13.4 | — | — | — | 13.4 |
| Black mill base D | 6.0 | — | — | — | 6.0 | — | — | — |

TABLE 9

| | Ink No. | | | |
|---|---|---|---|---|
| | Ex 33 | Ex 34 | Ex 35 | Ex 36 |
| Color of ink | Black | Cyan | Magenta | Yellow |
| Propylene carbonate | 51.0 | 51.3 | 49.3 | 50.3 |
| γ-butyrolactone | 26.5 | 26.7 | 25.5 | 26.0 |
| EBECRYL 210 | 16.5 | 16.0 | 14.0 | 10.3 |
| Cyan mill base A | — | 6.0 | — | — |
| Magenta mill base B | — | — | 11.2 | — |
| Yellow mill base C | — | — | — | 13.4 |
| Black mill base D | 6.0 | — | — | — |

The prepared inks were combined as shown in Table 10 and evaluation was performed in the same manner as in Example 1. Thus, the same results as in Example 1 were obtained.

In addition, regarding jettability, in a case where printing with a halftone dot area ratio of 100% was continuously performed for 2 minutes, good printing could be performed from the beginning to the end with any ink.

TABLE 10

| Ink | Black ink | Ex 9 | Ex 13 | Ex 17 | Ex 21 | Ex 25 | Ex 29 | Ex 33 |
|---|---|---|---|---|---|---|---|---|
| | Cyan ink | Ex 10 | Ex 14 | Ex 18 | Ex 22 | Ex 26 | Ex 30 | Ex 34 |
| | Magenta ink | Ex 11 | Ex 15 | Ex 19 | Ex 23 | Ex 27 | Ex 31 | Ex 35 |
| | Yellow ink | Ex 12 | Ex 16 | Ex 20 | Ex 24 | Ex 28 | Ex 32 | Ex 36 |
| Evaluation results | Odor | 1 | 1 | 1 | 1 | 1 | 1 | 1 |
| | Extraction amount | 1 | 1 | 1 | 1 | 1 | 1 | 1 |
| | Alcohol resistance | 1 | 1 | 1 | 1 | 1 | 1 | 1 |
| | High temperature resistance | 1 | 1 | 1 | 1 | 1 | 1 | 1 |
| | Line quality | 1 | 1 | 1 | 1 | 1 | 1 | 1 |

(Comparative Examples 3 and 4)

A cyan mill base E, a magenta mill base F, a yellow mill base and a black mill base H were prepared in the same manner as in the preparation of the cyan mill base A, the magenta mill base B, the yellow mill base C, and the black mill base D except that the compositions shown in Table 11 were adopted.

TABLE 11

| | Cyan mill base E | Magenta mill base F | Yellow mill base G | Black mill base H |
|---|---|---|---|---|
| NOVOPERM YELLOW H2G | — | — | 20 | — |
| IRGALITE RED D3773 | — | 20 | — | — |
| HELIOGEN BLUE D 7110 F | 30 | — | — | — |
| SP BLACK 250 FLUFFY | — | — | — | 34 |
| NPGPODA | 59 | 69 | 69 | 42 |
| EFKA 7701 | — | 10 | 10 | — |
| Solsperse 32000 | 10 | — | — | 23 |
| UV 12 | 1 | — | — | 1 |
| UV 22 | — | 1 | 1 | — |
| Total (parts by mass) | 100 | 100 | 100 | 100 |

Monomer inks CE 9, CE 10, CE 11, and CE 12 of Comparative Example 3 for comparison were prepared using the mill bases so as to have compositions shown in Table 12.

TABLE 12

| | Ink No. | | | |
|---|---|---|---|---|
| | CE 9 | CE 10 | CE 11 | CE 12 |
| Color of ink | Black | Cyan | Magenta | Yellow |
| SR341 | 83.7 | 79.5 | 82.6 | 78.7 |
| SR344 | 9.9 | 10.6 | — | 10.4 |
| UV 22 | 0.3 | 0.3 | 0.3 | 0.3 |
| BYK 307 | 0.1 | 0.1 | 0.1 | 0.1 |
| Cyan mill base E | — | 9.5 | — | — |
| Magenta mill base F | — | — | 17.0 | — |
| Yellow mill base G | — | — | — | 10.5 |
| Black mill base H | 6.0 | — | — | — |

Solvent inks CE 13, CE 14, CE 15, and CE 16 of Comparative Example 4 were prepared using the cyan mill base A, the magenta mill base B, the yellow mill base C, and the black mill base D.

TABLE 13

| | Ink No. | | | |
|---|---|---|---|---|
| | CE 13 | CE 14 | CE 15 | CE 16 |
| Color of ink | Black | Cyan | Magenta | Yellow |
| Diethylene glycol diethyl ether | 62.5 | 62.3 | 58.3 | 55.6 |
| Propylene carbonate | 26.5 | 26.7 | 25.5 | 26.0 |
| VINYL CHLORIDE/VINYL ACETATE COPOLYMER | 5.0 | 5.0 | 5.0 | 5.0 |
| Cyan mill base A | — | 6.0 | — | — |
| Magenta mill base B | — | — | 11.2 | — |
| Yellow mill base C | — | — | — | 13.4 |
| Black mill base D | 6.0 | — | — | — |

The prepared inks were combined as shown in Table 14 and used, and evaluation was performed in the same manner as in Example 1. However, in Comparative Example 4 using solvent inks CE 13, CE 14, CE 15, and CE 16, exposure was not performed.

TABLE 14

| Ink | Black ink | CE 9 | CE 13 |
|---|---|---|---|
| | Cyan ink | CE 10 | CE 14 |
| | Magenta ink | CE 11 | CE 15 |
| | Yellow ink | CE 12 | CE 16 |
| Evaluation results | Odor | 4 | 1 |
| | Extraction amount | 5 | 1 |
| | Alcohol resistance | 1 | 1* |
| | High temperature resistance | 1 | 1* |
| | Line quality | 1 | 3 |

*In a case where the solvent inks CE 13, CE 14, CE 15, and CE 16 of Comparative Example 4 were used, a long period of time was required until alcohol resistance and high temperature resistance were exhibited, and there was a practical problem.

In addition, it was found that as shown in Table 14, in a case of using monomers, the odor was extremely strong and the extraction amount was large. In addition, it was found that the solvent inks had landing interference on the base material and the image quality was deteriorated.

The entirety of the disclosure of Japanese Patent Application No. 2015-194070 filed on Sep. 30, 2015, is incorporated herein by reference.

All documents, patent applications and technical standards mentioned herein are incorporated in the present specification by reference to the same extent as if each individual document, patent application or technical standard was specifically and individually indicated to be incorporated by reference.

What is claimed is:

1. An ink jet recording method comprising, in order:
   a jetting step of jetting an ink including an organic solvent, an oligomer having an ethylenically unsaturated group, and a pigment, and not including a polymerization initiator or including a polymerization initiator at a content of more than 0% by mass and 0.1% by mass or less onto a base material using an ink jet head;
   a drying step of drying the ink by removing at least a part of the organic solvent in the jetted ink; and
   a curing step of curing the dried ink with an electron beam under an inert gas atmosphere,
   wherein the ink in the jetting step does not include an ethylenically unsaturated compound having a molecular weight of less than 1,000 or a content of an ethylenically unsaturated compound having a molecular weight of less than 1,000 is more than 0% by mass and 0.1% by mass or less with respect to a total mass of the ink.

2. The ink jet recording method according to claim 1, wherein an acceleration voltage of the electron beam is 150 kV or less and an absorbed dose of the electron beam of the dried ink in the curing step is 30 kGy or less.

3. The ink jet recording method according to claim 1, wherein a content of the oligomer having an ethylenically unsaturated group is 99% by mass or more with respect to a total mass of an ethylenically unsaturated compound in the ink in the jetting step.

4. The ink jet recording method according to claim 1, wherein the organic solvent includes a carbonate compound.

5. The ink jet recording method according to claim 4, wherein the organic solvent includes a glycol ether compound and a carbonate compound.

6. The ink jet recording method according to claim 1, wherein the drying step is a step of performing heat drying.

7. The ink jet recording method according to claim 1, wherein the ink in the jetting step does not include water or a content of water is more than 0% by mass and 5% by mass with respect to a total mass of the ink.

8. The ink jet recording method according to claim 1, wherein the base material is transported at a speed of 5 m/min to 300 m/min.

9. The ink jet recording method according to claim 1, wherein the oligomer having an ethylenically unsaturated group is selected from the group consisting of a urethane acrylate oligomer, a polyester acrylate oligomer, and an epoxy acrylate oligomer.

10. An ink jet recording device comprising:
   a base material transporting device in which an ink jet head, drying means, and an electron beam source are sequentially arranged; and
   an ink including an organic solvent, an oligomer having an ethylenically unsaturated group, and a pigment, and not including a polymerization initiator or including a polymerization initiator at a content of more than 0% by mass and 0.1% by mass or less,
   wherein the ink does not include an ethylenically unsaturated compound having a molecular weight of less than 1,000 or a content of an ethylenically unsaturated compound having a molecular weight of less than 1,000 is more than 0% by mass and 0.1% by mass or less with respect to a total mass of the ink.

11. The ink jet recording device according to claim 10, wherein an acceleration voltage of the electron beam in the electron beam source is 150 kV or lower, and the dried ink is curable at an absorbed dose of the electron beam of 30 kGy or less.

12. The ink jet recording device according to claim 10, wherein a content of the oligomer having an ethylenically unsaturated group is 99% by mass or more with respect to a total mass of an ethylenically unsaturated compound in the ink.

13. The ink jet recording device according to claim 10, wherein the organic solvent includes a carbonate compound.

14. The ink jet recording device according to claim 13, wherein the organic solvent includes a glycol ether compound and a carbonate compound.

15. The ink jet recording device according to claim 10, wherein the drying means has a heating dryer.

16. The ink jet recording device according to claim 10, wherein the oligomer having an ethylenically unsaturated group is selected from the group consisting of a urethane acrylate oligomer, a polyester acrylate oligomer, and an epoxy acrylate oligomer.

17. An ink jet recording method comprising, in order:
a jetting step of jetting an ink including an organic solvent, an oligomer having an ethylenically unsaturated group and having a molecular weight of 1,000 or more, and a pigment, and not including a polymerization initiator or including a polymerization initiator at a content of more than 0% by mass and 0.1% by mass or less onto a base material using an ink jet head;
a drying step of drying the ink by removing at least a part of the organic solvent in the jetted ink; and
a curing step of curing the dried ink with an electron beam under an inert gas atmosphere,
wherein a content of the oligomer having an ethylenically unsaturated group and having a molecular weight of 1,000 or more is 99% by mass or more with respect to a total mass of ethylenically unsaturated compounds in the ink in the jetting step.

18. The ink jet recording method according to claim 17, wherein
the ink in the jetting step does not include water or a content of water is more than 0% by mass and 5% by mass with respect to a total mass of the ink.

19. The ink jet recording method according to claim 17, wherein
the base material is transported at a speed of 5 m/min to 300 m/min.

20. The ink jet recording method according to claim 17, wherein
the oligomer having an ethylenically unsaturated group is selected from the group consisting of a urethane acrylate oligomer, a polyester acrylate oligomer, and an epoxy acrylate oligomer.

* * * * *